United States Patent [19]
Burdick et al.

[11] 3,982,153
[45] Sept. 21, 1976

[54] RAPID WARM-UP HEATER CIRCUIT

[75] Inventors: Glen Alden Burdick, Waterloo; Edward Izydor Zmuda, Seneca Falls, both of N.Y.

[73] Assignee: GTE Sylvania Incorporated, Stamford, Conn.

[22] Filed: Nov. 12, 1975

[21] Appl. No.: 631,231

[52] U.S. Cl. .................................. 315/8; 315/94; 315/106; 315/309; 317/157.5 TV; 328/270
[51] Int. Cl.² ......................................... H01F 13/00
[58] Field of Search ............... 315/8, 94, 106, 107, 315/119, 309; 317/157.5 TV; 328/270

[56] References Cited
UNITED STATES PATENTS

| 3,333,143 | 7/1967 | Van Anrooy et al. | 315/8 |
| 3,358,182 | 12/1967 | Bohnstedt | 315/8 |
| 3,534,223 | 10/1970 | Murphy | 315/106 |
| 3,798,493 | 3/1974 | Manske | 328/270 X |
| 3,886,401 | 5/1975 | Berg | 317/157.5 TV X |

Primary Examiner—Eugene La Roche
Attorney, Agent, or Firm—Norman J. O'Malley; Frederick H. Rinn; Robert T. Orner

[57] ABSTRACT

An improvement for effecting rapid warm-up of the thermionic cathode means in a color CRT display device utilizing a degaussing circuit including a temperature responsive resistive element in series with the primary winding of an inductive means. A direct operational relationship is established between the degaussing and cathode heater circuits by having the secondary winding of the inductor series coupled therein. Upon simultaneous activation of both circuits, through a common switching means, a transitory surge of current is supplied by the degaussing circuit to the heater circuit, via the common inductor, to effect an accelerated temperature response in the heater.

6 Claims, 4 Drawing Figures

TIME

RAPID WARM-UP HEATER CIRCUIT

BACKGROUND OF THE INVENTION

This invention relates to a cathode ray tube operational circuit means and more particularly to an improvement in the circuit means for energizing a heater element associated with thermionic emission means within a cathode ray tube.

In a color display apparatus, such as a television receiver, the operational mode of the cathode ray tube (CRT) is achieved when the temperature of the thermionic emissive cathode material therein is raised to a thermal level to promote the generation of a stream of electrons, the resultant beam being thence controlled to effect the full operational mode of the tube. The required temperature level of the thermionic cathode emission means is conventionally effected by an electric heating element proximally associated therewith. In television and allied dynamic display apparatus it has been the desire to effect operation of the equipment as soon as possible after activation of the power turn-on switching means. For example, television receivers employing solid state circuitry experience a time lag existent between the activation of power switching and the resultant reproduction of correlated video and audio responses, such being dependent primarily upon the time span required by the heater means in the CRT to bring the temperature of the cathode or cathodes therein to the thermal level required for the initiation of operational electron emission. To reduce the span of time between the initiatory power switching and the subsequent visual response of the display apparatus, a practice developed in the art whereby a stand-by potential was applied to the heater or heaters in the cathode ray tube to maintain the cathode temperature at a predetermined thermal level. In such an arrangement, switching on of the apparatus supplied the additional heater voltage required to raise the cathode temperature to full electron emission level, thereby quickly inaugurating operational response of the apparatus. While application of the stand-by potential to the heater circuitry aptly fulfilled the desire for rapid initial operation, it, in general, constituted an unproductive utilization of electrical energy.

In striving to achieve more efficient usage of electrical energy in a television receiver, there was developed in the prior art, a rapid warm-up type of heater circuit which included a series coupled temperature responsive resistive element. Upon activation of this circuit, the room-ambient resistance of the element allowed the passage of a surge of current which then decreased to the normal heater operating level as the temperature of the element increased; the resultant being a predetermined resistive load in the circuit. While the rapid warm-up of the heater is accomplished by this circuit and efficiency of energy usage improved thereby, inclusion of the temperature responsive resistive element therein constitutes heat-related energy consumption which is a deterrent to the realization of still greater efficiency in electrical energy utilization.

OBJECTS AND SUMMARY OF THE INVENTION

It is an object of this invention to reduce and obviate the aforementioned and other disadvantages evidenced in the prior art. Another object of the invention is to effect improvement in the circuit means for accomplishing rapid warm-up of cathode ray tube heater means upon initiation of the operating mode. A further object of the invention is to provide improvement in the circuitry of a television receiver for further conserving electrical energy while yet effecting rapid warm-up of the cathode means in the CRT upon initiation of the operating mode of the receiver.

These and other objects and advantages are achieved in one aspect of the invention wherein a color cathode ray tube display apparatus, utilizing a degaussing circuit including a temperature responsive resistive element, also has directly related circuit means for energizing the cathode heater means within the CRT to effect rapid warm-up of the cathode means upon initiation of the switching inducing the operating mode.

The invention relates to an improvement in the CRT heater energizing circuitry wherein there is included an AC power supply, a first transformer means and an inductive load. The power supply portion has switching means suitably associated therewith to control the output thereof. The first transformer is coupled to the power output in a manner that the primary winding is activated by the closing of the switching means, while the secondary winding thereof is series connected to the heater means in the cathode ray tube. In addition, an inductive load is series coupled in the heater circuit and operated in conjunction with the degaussing circuit to provide an induced transitory increase of heater potential upon activation of the switching means energizing the operating mode of the related circuitry.

DESCRIPTION OF THE PREFERRED EMBODIMENTS

For a better understanding of the present invention, together with other and further objects, advantages and capabilities thereof, reference is made to the following specification and appended claims in connection with the aforedescribed drawings.

Figure 1:
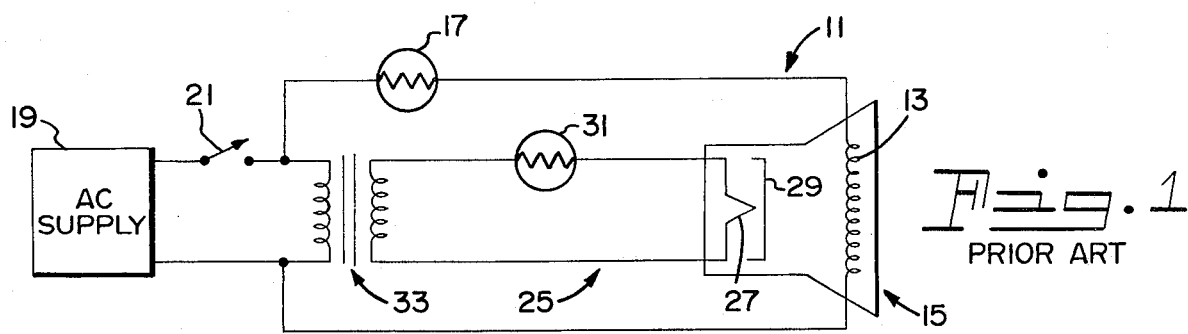
FIG. 1 is a schematic diagram disclosing separate degaussing and heater circuits as employed in the prior art.

It is conventional practice in dynamic color display devices, such as color television receivers, to employ a plural beam CRT utilizing an internal shadow mask or apertured structure oriented in spatial relationship with the patterned display screen. This apertured structure, which is formed of permeable metallic material, was found to be susceptible to a variety of magnetic influences such as the earth's magnetic field and a variety of ambient fields emanating from environmentally related household appliances. Since these magnetic influences may adversely affect the performance characteristics of the cathode ray tube per se, it has been a remedial practice in the art to exteriorly position demagnetizing or degaussing means around the forward portion of the cathode ray tube in close proximity to the region of the shadow mask and the tube supporting structure. A basic circuit embodiment 11 of one such prior art degaussing arrangement is shown in FIG. 1, such being only a portion of the circuitry involved in a CRT display device. In this arrangement, one or more coils 13 are oriented about the tube 15 and series coupled in a degaussing circuit. A temperature responsive resistive element, such as a positive temperature coefficient resistor (PTC) 17, is also included and series connected in the degaussing circuit which is coupled to an AC supply 19 through switching means 21. Closing of the switch applies the degaussing potential which gradually decreases in magnitude as the temperature of the PTC element 17 is raised. Thus, the waveform of the degaussing current in the demagnetizing coils 13 is tapered in amplitude as the cathode ray tube is brought to operational level. Since the theory of CRT demagnetization is well known in the art, no further elucidation is required at this time.

Also shown in FIG. 1, is a prior art embodiment of a separate heater circuit 25 employed for elevating the temperature of a heating element 27 associated with the cathode 29 in the CRT 15. While a color cathode ray tube usually employs a plurality of cathodes and heaters, for purposes of simplification, only one heater 27 and cathode 29 combination is illustrated. The schematically shown heater circuit 25 likewise includes a separate series connected temperature responsive resistive element, such as a positive temperature coefficient resistor (PTC) 31. This heater circuit is likewise coupled to the AC supply 19 through switching means 21 and includes a transformer 33 for establishing the necessary voltage level required for operation of the heater means 27. Since the self-heated PTC element 31 in the circuit manifests low cold resistance, a higher-than-usual initial surge of heater current, for example, in the order of 5 seconds duration, is allowed to pass through the circuit 25 thereby measurably decreasing the time span required for heater warmup. Once the heat induced resistance of the PTC element 31 is stabilized in the circuit, the heater current is reduced to the normal operating level. However, some power is dissipated in the PTC element. Since the separate prior art circuit means both include PTC elements 17 and 31, the accumulated power loss represents a substantial amount of electrical energy to effect and maintain a thermal induced resistive characteristic in each circuit.

Figure 2:
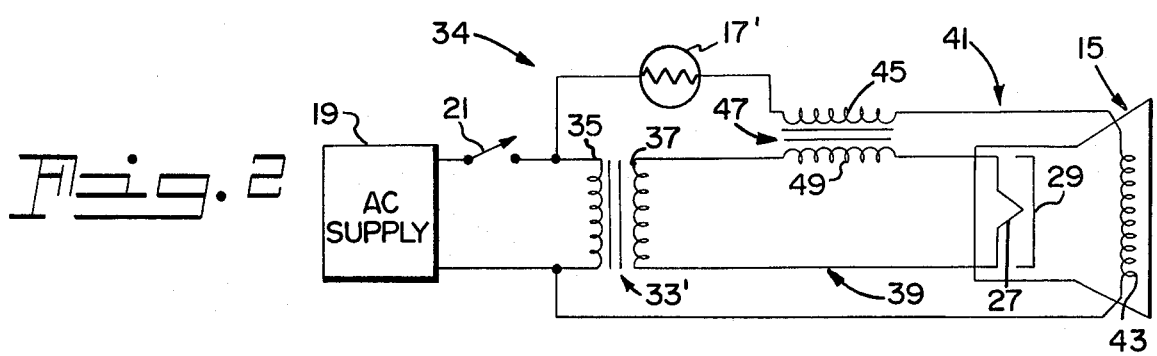
FIGS. 2 and 3 are schematic diagrams illustrating embodiments of the related degaussing and heater circuits in accordance with the invention.

Reference is directed to FIG. 2 wherein the improvement of the invention is delineated as a first embodiment 34. The improved circuitry includes an AC power supply 19 provided with switching means 21 as hereinbefore utilized. Thence, a first inductor means of transformer 33' is connected across the output of the AC supply 19 in a manner that the switching means 21 activates the primary winding 35 thereof. The secondary winding 37 of this first inductor 33' is series coupled to the heater element 27 of the cathode 29 in the CRT 15 to provide a heater energizing circuit 39.

A related degaussing circuit 41 is likewise coupled across the AC supply 19 in a manner to be controlled by the switching means 21. This circuit comprises coil means 43 associated with the tube 15, a temperature responsive resistive element, such as a positive temperature coefficient resistor (PTC) 17', and an inductive load in the form of a primary winding 45 of a second inductor or transformer 47, all elements being connected in a suitable series arrangement. As shown, the second inductor 47 is a step-down transformer whereof the secondary winding 49 is series connected in the heater circuit 39 thereby providing an induced initial transitory boost to the heater current upon activation of the switching means 21 energizing the operating mode of the related circuitry. With proper phasing of the second transformer 47, the normal degaussing surge current is coupled into the heater circuit 39. The combination of the inrush of heater current, due to the low heater resistance and the transformed degaussing current, imparts to the heater 27 a hot shot of several seconds duration. As the degaussing current decreases, as exemplified by the power waveform of decreasing amplitude 51 as shown in FIG. 4, the heater circuit inrush period is over, and the heater current therein stabilizes at the rated value.

Figure 3:
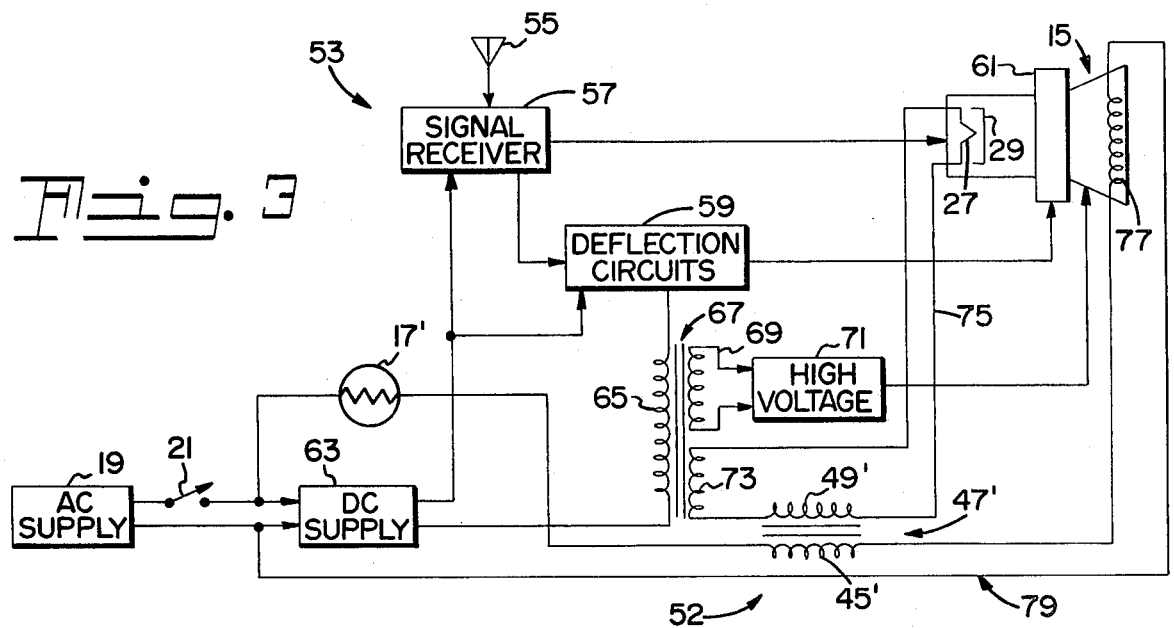

Another or second embodiment 52 of the invention is illustrated in FIG. 3 wherein the basic components of a conventional television receiver 53 are denoted in block form while the invention is shown schematically in association therewith. In brief, an antenna or an equivalent incoming receiving means 55 is connected to the signal receiver section 57 of the device wherein the incoming signal information is processed in the usual manner. Luminence and chrominance signals are separated in the receiver section and suitably coupled to the appropriate electrodes in the associated color CRT 15. Synchronizing pulses separated from the composite video signals are coupled to the deflection circuit section 59 of the device wherefrom the vertical and horizontal deflection signals are coupled to the respective windings in the yoke means 61 exteriorly positioned on the neck of the tube 15. Power from an AC supply 19 is conveyed through switching means 21 to a DC supply 63 from which operating potentials of usual values are coupled to the respective signal receiver 57 and deflection circuits 59. The DC supply 63 additionally furnishes B+ power to the primary winding 65 of a first inductor 67, which in this instance is a flyback or horizontal output transformer. The output from a first winding 69 of several secondary windings of this first transformer 67 is connected to a high voltage supply means 71 from whence a high voltage potential is coupled to the final anode in the color CRT 15. A separate or second 73 secondary winding of this first transformer 67 is included as part of the heater circuit 75 for supplying suitable power for energizing the heater means 27 associated with the cathodes 29 in the CRT 15.

Degaussing means 77, associated with the forward portion of the color CRT 15, are coupled to the AC supply 19 through the aforementioned switching means 21. As in the first embodiment, the degaussing circuit 79 includes in series relationship, a temperature responsive resistive element, such as a positive temperature coefficient resistor (PTC) 17' and an inductive load 45', such as the primary winding of a second transformer 47'. The secondary winding 49' of this transformer is series connected in the aforedescribed CRT heater circuit 75. Consequently, when the switching means 21 is closed to supply power to the various conjunctive circuits 75 and 77 in the display apparatus 53, an extra surge of power is induced in the heater circuit 75 via the second transformer 47' which is a common element to both the degaussing and heater circuits. The resultant accelerated heater warm-up time is similar to that priorly described for the first embodiment 34 of the invention.

Figure 4:
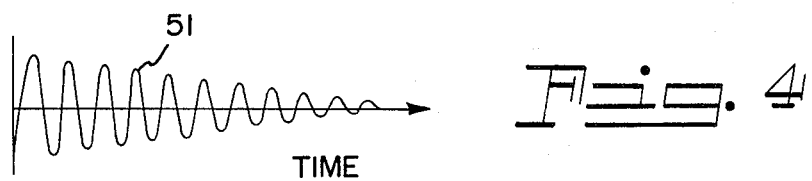
FIG. 4 is a diagrammatic illustration showing the decreasing amplitude of the power waveform as evidenced in the degaussing circuit.

Another form of a prior art degaussing circuit utilizes a combination of a negative temperature coefficient thermistor and a voltage dependent resistor to provide a signal having a waveform similar to that illustrated in FIG. 4. Accordingly, those skilled in the art will realize that, while embodiments of the invention utilizing a PTC element for providing an energizing signal of decreasing amplitude have been illustrated and described, the concept of the invention has sufficient breadth to be applicable to other circuits and devices for accomplishing a similar function.

Thus, there is provided an improvement in the circuitry of a color CRT display device whereby conservation of electrical energy is achieved while effecting desired rapid warm-up of the cathode means in the CRT upon initiation of the operating mode of the device.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a color display device employing a cathode ray tube and utilizing a degaussing circuit including a temperature responsive resistive element, an improvement in the circuit means for energizing heater means associated with thermionic emission means within said tube to effect rapid warm-up of said heater upon initiation of an operating mode, the improvement in said circuit means comprising:

an AC power supply having switching means to control the AC output thereof, said degaussing circuit being connected to said AC output and energized through said switching means;

a first transformer having a primary winding activated by the closing of said switching means, and a secondary winding series connected to said heater element to provide a circuit for energizing said heater; and an inductive means having one portion series connected in said heater circuit and a related portion series connected to said degaussing circuit for providing an induced transitory increase of heater potential responsive to said temperature responsive resistive element upon the activation of said switching means.

2. The circuit means improvement for energizing a cathode ray tube heater element according to claim 1 wherein said first transformer has said primary winding connected across said AC output.

3. The circuit means improvement for energizing a cathode ray tube heater element according to claim 1 wherein said first transformer is a flyback transformer.

4. The circuit means improvement for energizing a cathode ray tube heater element according to claim 1 wherein said temperature responsive resistive element is a positive temperature coefficient resistor (PTC) which is series connected in said degaussing circuit.

5. The circuit means improvement for energizing the cathode ray tube heater element according to claim 1 wherein said inductive means is in the form of a second transformer having a primary winding series connected in said degaussing circuit, and a secondary winding series connected in said heater circuit, said degaussing circuit being connected across said AC output and controlled by said switching means.

6. The circuit means improvement for energizing a cathode ray tube heater element according to claim 5 wherein said second transformer is a stepdown transformer.

* * * * *